United States Patent [19]

Montsinger

[11] Patent Number: 5,725,954
[45] Date of Patent: Mar. 10, 1998

[54] FIBER REINFORCED THERMOPLASTIC COMPOSITE WITH HELICAL FLUTED SURFACE AND METHOD OF PRODUCING SAME

[76] Inventor: Lawrence V. Montsinger, 1837 Kilmonack La., Charlotte, N.C. 28226

[21] Appl. No.: 528,202

[22] Filed: Sep. 14, 1995

[51] Int. Cl.$^6$ ............................................. B32B 3/00
[52] U.S. Cl. .................. 428/397; 428/357; 428/362; 428/364; 428/369; 428/397; 428/400; 428/401
[58] Field of Search ........................ 428/357, 362, 428/364, 369, 397, 400, 401

[56] References Cited

U.S. PATENT DOCUMENTS 5,176,775  1/1993  Montsinger .
5,447,793  9/1995  Montsinger .

*Primary Examiner*—Richard Weisberger
*Attorney, Agent, or Firm*—Bell Seltzer Intellectual Property Law Group of Alston & Bird LLP

[57] ABSTRACT

There is provided an elongate fiber reinforced thermoplastic composite which comprises a multiplicity of filamentary fibers, each extending longitudinally of the composite and a thermoplastic resin matrix impregnating and surrounding the filamentary fibers. The composite has alternating lobes and valleys on its surface defining a fluted cross section. The lobes and valleys extend helically along the longitudinal axis of the composite. In a preferred form of the invention, the filamentary fibers also extend helically along the longitudinal axis of the composite, and desirably, the helical pitch of the filamentary fibers is substantially the same as that of the lobes and valleys. The helical pitch may suitably range from about 1.5 to about 8 inches and the elongate composite may have a diameter of from 0.125 to 8 inches. The fibers may comprise from about 20 to about 80 percent by weight of the composite. The number of fibers in the elongate composite may be within the range of 2,000 to 70,000,000 filaments.

17 Claims, 4 Drawing Sheets

FIBER REINFORCED THERMOPLASTIC COMPOSITE WITH HELICAL FLUTED SURFACE AND METHOD OF PRODUCING SAME

This invention relates to fiber reinforced composite materials. More particularly, this invention relates to composite materials formed of a thermoplastic resin reinforced by fibers, and to a method for producing such materials, where the thermoplastic and fiber components are such as to impart to the composite materials enhanced strength.

According to the present invention there is provided an elongate fiber reinforced thermoplastic composite which comprises a multiplicity of filamentary fibers, each extending longitudinally of the composite and a thermoplastic resin matrix impregnating and surrounding the filamentary fibers. The composite has alternating lobes and valleys on its surface defining a fluted cross section. The lobes and valleys extend helically along the longitudinal axis of the composite. In a preferred form of the invention, the filamentary fibers also extend helically along the longitudinal axis of the composite, and desirably, the helical pitch of the filamentary fibers is substantially the same as that of the lobes and valleys. The helical pitch may suitably range from about 1.5 to about 8 inches and the elongate composite may have a diameter of from 0.125 to 8 inches. The fibers may comprise from about 20 to about 80 percent by weight of the composite. The number of fibers in the elongate composite may be within the range of 2,000 to 70,000,000 filaments.

Elongate fiber reinforced thermoplastic composites in accordance with the present invention can be produced in the form of elongate bars or rods, which can be advantageously used as reinforcing bars in reinforced concrete in lieu of conventional steel reinforcing bars. The spiral flutes on the surface of the bar provides a mechanical grip or purchase for locking the reinforcing bar into concrete. Additionally, the fluted cross section provides improved heat removal from the core of the bar during cooling of the thermoplastic matrix material in order to control shrinkage and warpage. The flutes provide increased surface area as compared to a circular cross section and the valleys are closer to the core to facilitate heat transfer. The spiral or helical twist of the filamentary fibers also imparts increased strength to the composite bar.

Some of the features of the invention having been stated, others will become apparent as the description proceeds, when taken in connection with the accompanying drawings, in which.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
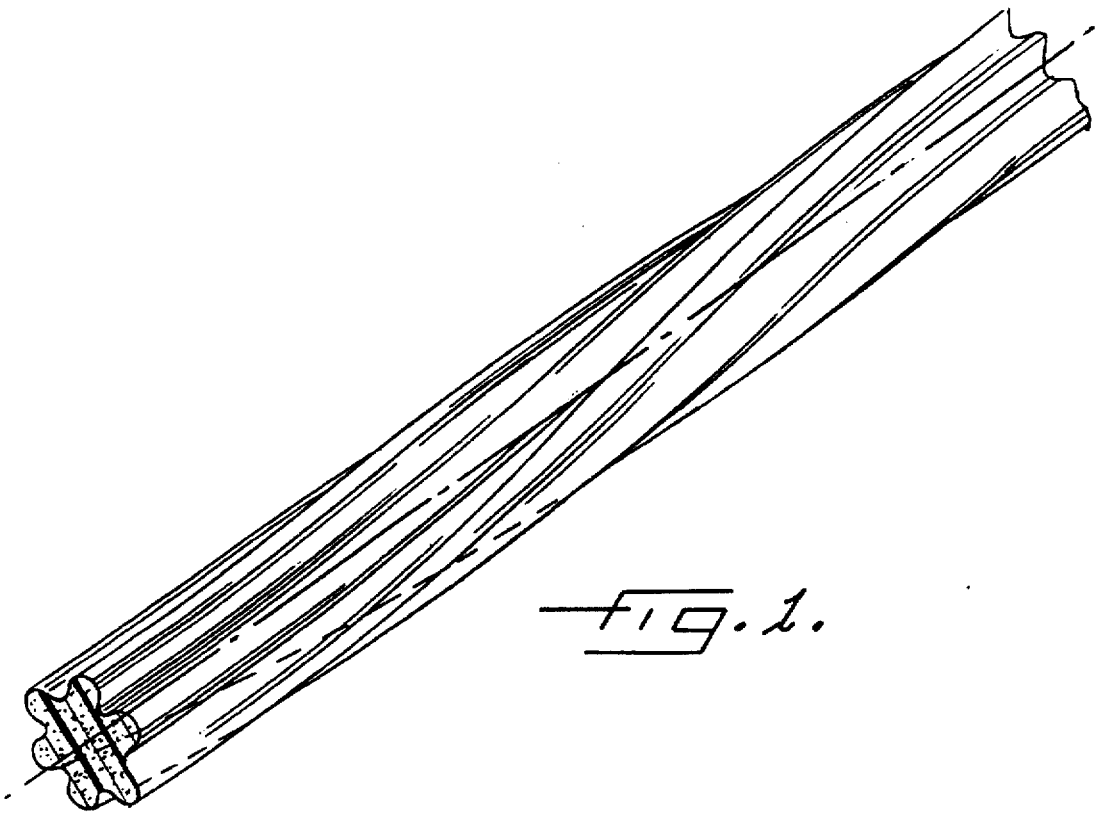
FIG. 1 is a perspective view showing a fiber reinforced composite according to the present invention.

Referring now more particularly to the accompanying drawings, a reinforcing bar in accordance with the present invention is illustrated in FIG. 1. As shown, the bar has a six-lobed fluted cross-sectional configuration defined by six alternating rounded lobes L and six intervening rounded valleys V. The respective flutes which are formed on the surface of the bar extend helically about the axis of the bar. The reinforcing fibers are distributed substantially throughout the cross section of the composite and the individual fibers are immersed in and surrounded by the thermoplastic resin matrix. In other words, the individual fibers are thoroughly wetted by the thermoplastic resin as distinguished from having groups or bundles of fibers surrounded by the resin matrix. The reinforcing bar may have any length, but typically is at least several feet in length. The continuous filamentary reinforcing fibers of the reinforcing bar have a length which is coextensive with the length of the bar.

Elongate fiber reinforced thermoplastic composites in accordance with the present invention can also be produced in other useful forms such as continuous profiles or pellets. Pellets produced in accordance with the present invention suitably have a length of from about 0.25 to about 4 inches, and more preferably from about 0.5 to 2 inches. The pellets are particularly suited for use in injection molding processes for producing fiber reinforced injection molded articles. Pellets in accordance with the present invention may be characterized as "long fiber" pellets. By the term "long fiber" pellets, it is meant that the fibers have a length coextensive with the length of the pellet. Thus, for example, in a ½ inch length pellet, the reinforcing fibers also have a length of one inch.

Elongate fiber reinforced thermoplastic composites in accordance with the invention can have a diameter ranging from about 0.125 inch to about 8 inches and can contain from about 2,000 to 70,000,000 filaments, depending upon the overall diameter of the composite and the fiber content. The fiber content can range from 20 to 80 percent by weight. The fiber content is determined by the number of rovings used in the process. A typical fiber glass roving, for example, contains 4,000 filaments per roving. The fiber concentration or fiber content is controlled by varying the diameter of the restricted forming die in relation to the number of rovings used. As explained more fully below, the composites are produced by a pultrusion process wherein the molten thermoplastic resin and reinforcing fibers pass through a restricted die opening of an overall diameter and cross sectional shape corresponding to the desired cross sectional shape of the composite.

Table 1 illustrates the relationship of die opening size and the number of rovings (each of 4000 filaments) to the resulting fiber concentration in weight percent over an exemplary range of fiber concentrations.

TABLE 1

| | Fiber Concentration (weight percent) | | | | | | |
|---|---|---|---|---|---|---|---|
| # of | Die Opening Size (inches) | | | | | | |
| rov. | 8.0 | 4.0 | 2.0 | 1.0 | .5 | .250 | .125 |
| 1 | | | | | | | 32.2 |
| 2 | | | | | | | 51.9 |
| 4 | | | | | | 32.2 | 75.0 |
| 8 | | | | | | 51.9 | |
| 16 | | | | | 32.2 | 75.0 | |
| 32 | | | | | 51.9 | | |
| 64 | | | | 32.2 | 75.0 | | |
| 128 | | | | 51.9 | | | |
| 256 | | | 32.2 | 75.0 | | | |
| 512 | | | 51.9 | | | | |
| 1024 | | 32.2 | 75.0 | | | | |

TABLE 1-continued

| # of rov. | Fiber Concentration (weight percent) | | | | | | |
|---|---|---|---|---|---|---|---|
| | Die Opening Size (inches) | | | | | | |
| | 8.0 | 4.0 | 2.0 | 1.0 | .5 | .250 | .125 |
| 2048 | | 51.9 | | | | | |
| 4096 | 32.2 | 75.0 | | | | | |
| 8192 | 51.9 | | | | | | |
| 16384 | 75.0 | | | | | | |

Table 2 shows how the specific gravity of the composite and the raw material cost vary as a function of fiber content. In the specific example shown, the thermoplastic resin has a specific gravity of 0.90 and a melt density of 0.660. The fiber has a density of 2.54. The fiber has an assumed cost of $0.70 per pound and the resin a cost of $0.50 per pound. From this illustration, persons skilled in the art will readily see how the specific gravity of the composite and/or the cost can be controlled as desired for other resins and other fibers.

TABLE 2

| | Fiber Content (weight percent) | | | | | | |
|---|---|---|---|---|---|---|---|
| | 20 | 30 | 40 | 50 | 60 | 70 | 80 |
| Composite specific gravity | 1.03 | 1.12 | 1.21 | 1.33 | 1.47 | 1.64 | 1.86 |
| Fiber Content (vol. %) | 9.2 | 15.1 | 22.1 | 30.7 | 41.5 | 55.4 | 73.9 |
| Raw Material Cost | 0.57 | 0.59 | 0.61 | 0.63 | 0.65 | 0.67 | 0.69 |

Figure 2:
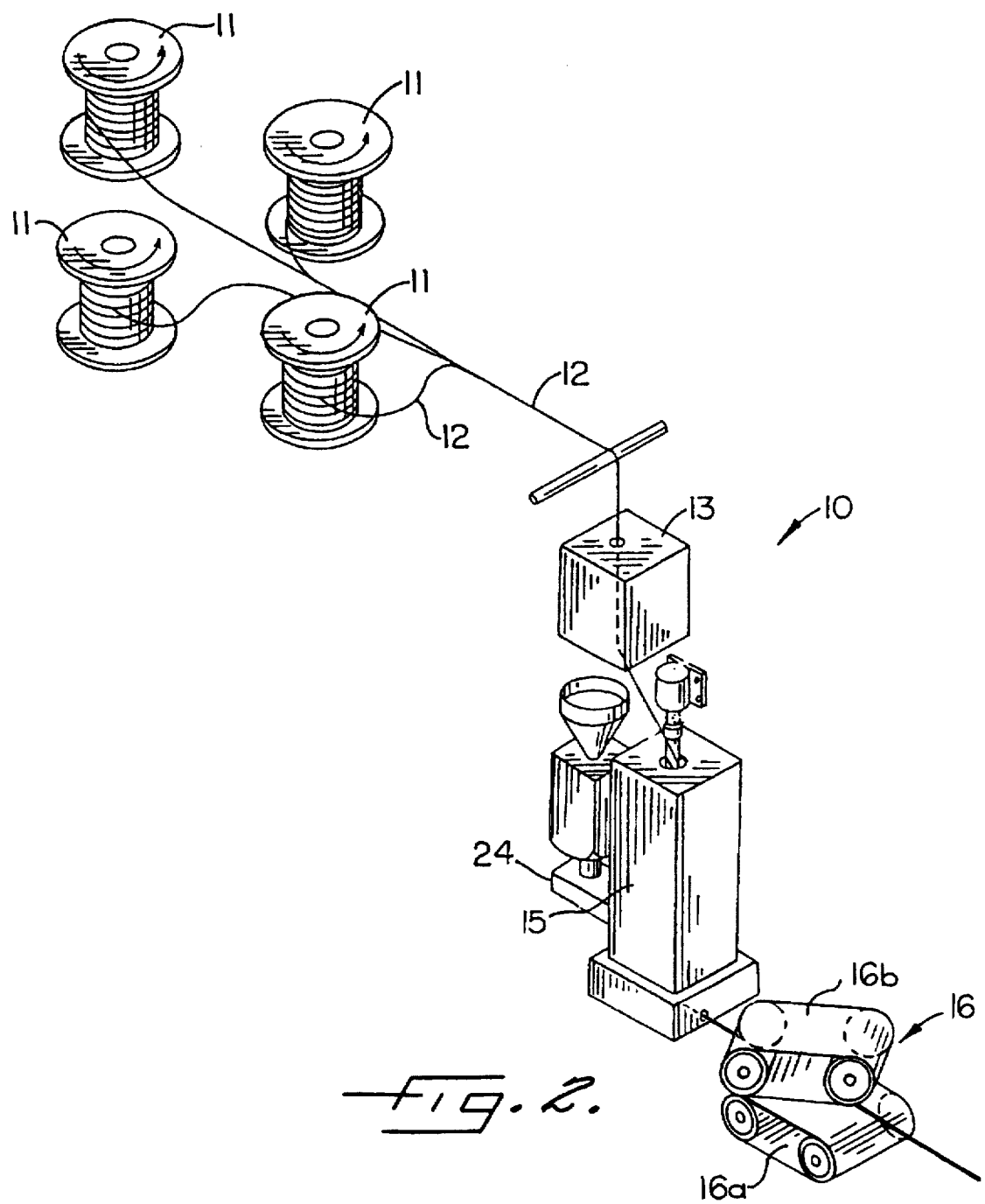
FIG. 2 is a schematic illustration of an apparatus for producing the fiber reinforced composite.

A process and apparatus for producing the elongate fiber reinforced thermoplastic composites of this invention is shown schematically in FIG. 2 and is described in greater detail in Montsinger U.S. Pat. Nos. 5,176,775 and 5,447,793, which are incorporated herein by reference.

The apparatus, generally indicated at 10 in FIG. 2, has fiber supply means 11, preferably in the form of a creel mounting a plurality of packages of fiber material for supplying continuous filament fiber 12; advancing means for advancing the fiber 12 from the creel along a predetermined path of travel; heating means 13 disposed along the predetermined path of fiber travel for heating advancing fiber to a predetermined elevated temperature; plastic supply means, preferably in the form of an extruder 24, for supplying molten, heated thermoplastic material; and an impregnation chamber 15 disposed along the predetermined path of fiber travel and connected to the extruder 24 for receiving a flow of heated thermoplastic material. The heated thermoplastic material is directed through the impregnation chamber in a direction opposite to that of the advancing fiber and it impregnates and surrounds the advancing heated fiber. Shear forces arising between the advancing heated fiber and the flow of thermoplastic material promote wetting of the fiber by and impregnation of the fiber by the thermoplastic material.

The supply means or creel 11 is designed for receiving and retaining a plurality of packages of continuous fiber strand material. The strand material may be a man made or artificial continuous filament such as an organic fiber, glass fiber, aramid fiber such as Kevlar, carbon fiber, or metallic fiber. Typically, such fibers are supplied by fiber producers in the form of a roving, tow or band, and may be more or less twisted depending upon the specific material and manner of handling prior to introduction into the processes of this invention. Desirably, the creel will deliver the fiber into the process of this invention with minimal twist, in order to provide the least possible interference with impregnation or enclosure of the fiber by the thermoplastic resin.

Fiber is drawn from the creel along a path of travel defined by appropriate guide rolls, bars and the like. Further, means for controlling the tension in the fiber may be appropriate or required at various points along the path in order to assure orderly passage of the fiber, and will be provided as deemed necessary by persons skilled in the arts of transporting fiber materials.

Fiber F leaving the creel passes to a heating means indicated generally at 13, where the fiber is heated to an elevated temperature closer to the temperature of the molten, flowing thermoplastic resin with which the fiber will be encircled. In the embodiment illustrated, the heating means 13 takes the form of a heating chamber enclosing advancing fiber and means for circulating hot gas through the chamber. Alternatively, the heating means may take the form of a chamber or tunnel within which the fiber F is exposed to infrared radiation. The preheated fiber is then advanced into and through the impregnation chamber 15 where the fiber is thoroughly impregnated with the thermoplastic resin.

The impregnation chamber 15 includes an elongate impregnation passageway oriented generally vertically and arranged for downward passage of fiber therethrough and for upward movement of thermoplastic material. The passageway is heated by appropriate means such is cartridge electrical resistance heaters embedded in the structure of the chamber. The counter-current movement gives rise to shear forces between the advancing heated fiber and the flow of thermoplastic material which, in accordance with this invention, promote wetting of the fiber by intimately enclosing and surrounding the fiber in the thermoplastic material. Additionally, the path along which the fiber is guided within the impregnation column is such as to cause the thermoplastic material entrained in downward movement to be squeezed between the fibers.

Figure 3:
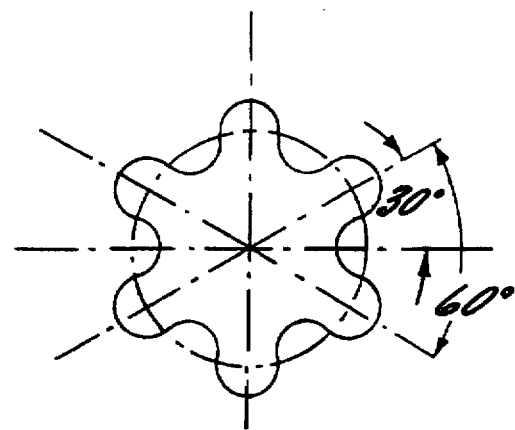
FIG. 3 is a schematic plan view showing the configuration of a die for forming the fiber reinforced composite.

At the foot of the impregnation passageway, the impregnated fibers pass about a turning guide or bar and then pass generally horizontally, exiting from the apparatus through a restricted die opening. By appropriate selection of the diameter of the die opening, the ratio of the polymer to fibers can be controlled as desired. The die has a noncircular fluted configuration, an example of which is shown in FIG. 3. In this illustrated embodiment, the fluted die has alternating valleys and lobes or ribs which, on the extruded composite, form correspondingly shaped lobes and valleys on the surface of the composite. In the embodiment illustrated, there are six lobes and six valleys formed by the die on the composite. However, the number of lobes can be selected within a broad range (e.g. from 3 to 150) depending upon the overall diameter of the product and its intended end use. Thus, for example, for composite products in the form of bars intended for reinforcing concrete, where the bar does not exceed about 1 inch in diameter, the number of lobes can range from about 3 to about 20. Preferably, the lobes and valleys have an obtuse, generally smooth configuration. In the particular embodiment shown, the ribs and valleys are rounded and are similar to the configuration of a screw thread form known as a knuckle form thread. The relatively smooth form of the lobes and valleys avoids concentrations of stress at particular locations and thus contributes to enhanced overall strength.

Upon emerging from the die, the polymer impregnated fiber may be cooled, either by natural ambient air cooling or by forced air, water or other suitable means. Downstream from the cooling zone, the composite passes through a puller 16. In the illustrated embodiment, the puller comprises a pair of opposing driven belts 16a, 16b which engage the composite on opposite sides thereof and impart a longitudinal pulling force thereto. In the particular arrangement shown herein, the puller device serves not only to impart a longitudinal pulling force to the composite, but also to twist the composite as it is being advanced longitudinally. This is achieved by canting or skewing one or both of the belts. In the embodiment shown, one of the belts 16a is oriented parallel to the longitudinal direction and the other belt 16b is positioned at an angle to the longitudinal direction. The particular angle can be selected over a wide range depending upon the overall diameter of the product and the amount of twist which is desired to be imparted to the composite. The twist may typically range from about 90° to 450° per foot of composite. Although in this illustrated embodiment, the puller is used for imparting twist, the present invention is not limited thereto and those skilled in the art will recognize that there are alternative ways to impart twist to the composite.

As a result of the twist which is imparted to the composite at the puller, the lobes and valleys which form the fluted cross section of the surface of the composite extend helically along the longitudinal axis of the composite. The pitch of the helical threads defined by the alternating lobes and valleys may range from about 1.5 inches to about 8 inches. As is well known, the pitch of a thread is the distance parallel to the axis between corresponding points on adjacent threads.

The twist which is imparted to the composite at the puller also results in the filamentary fibers extending helically along the longitudinal axis of the composite. Desirably, the helical fibers assume a pitch corresponding to the pitch of the flutes or threads on the surface of the composite. The twist which is imparted to the composite and the filamentary fibers therein reaches upstream from the puller to the die and advantageously results in better wetting out of the individual fibers by the polymer matrix and better fiber distribution. This also provides improved tensile properties to the composite.

The present invention can be used with a variety of different kinds of filamentary fibers. In addition to glass fiber, which is advantageous because of its excellent tensile properties, widespread availability and economical cost, the invention can be used with other fibers such as carbon fibers, metallic fibers or other synthetic fiber-forming polymers such as polyethyleneterephthalate, aramide such as Kevlar polybutyleneterephthalate, polyamide, polypropylene and polyethylene.

Practically any thermoplastic polymer which is capable of extrusion could be employed in the composite of the present invention. Particularly useful in producing high strength materials, such as reinforcing bars, are thermoplastic resins such as polypropylene homopolymer, propylene copolymers and ter-polymers, polyethylene and nylon. Other polymers which could be employed for other applications include polyesters such as polyethyleneterephthalate (PET), polybutyleneterephthalate (PBT), polyurethane, polyoxymethylene, polycarbonate, liquid crystal polymers, polyphenylene sulfide and polyvinylchloride.

One specific embodiment of a composite suitable for use as a concrete reinforcing bar is formed from fiber glass roving and a polypropylene matrix polymer. This construction is particularly advantageous because of its light weight. Its specific gravity ranges from 1.03 to 1.86 for polypropylene with glass from 20 to 80 weight percent as compared to steel at a specific gravity of 7.9. The composite is also non-corrosive, whereas corrosion is a serious problem for steel reinforcing bars. The composite is also nonmagnetic, which opens the opportunity for using the reinforcing bar in many applications where steel would not be permitted. The composite has high strength, and is also quite advantageous in that it is recyclable, unlike composite reinforcing bars made from thermosetting matrix polymers. The composite has a low coefficient of linear thermoexpansion and has low thermoconductivity to achieve enhanced bonding between the fibers and the matrix polymer, a chemical coupling agent can be used on the fibers such as maleic anhydride, for example. In addition, to provide enhanced bonding in the concrete, the surface of the composite bar material may be energized, such as by plasma or corona treatment.

Figure 4B:
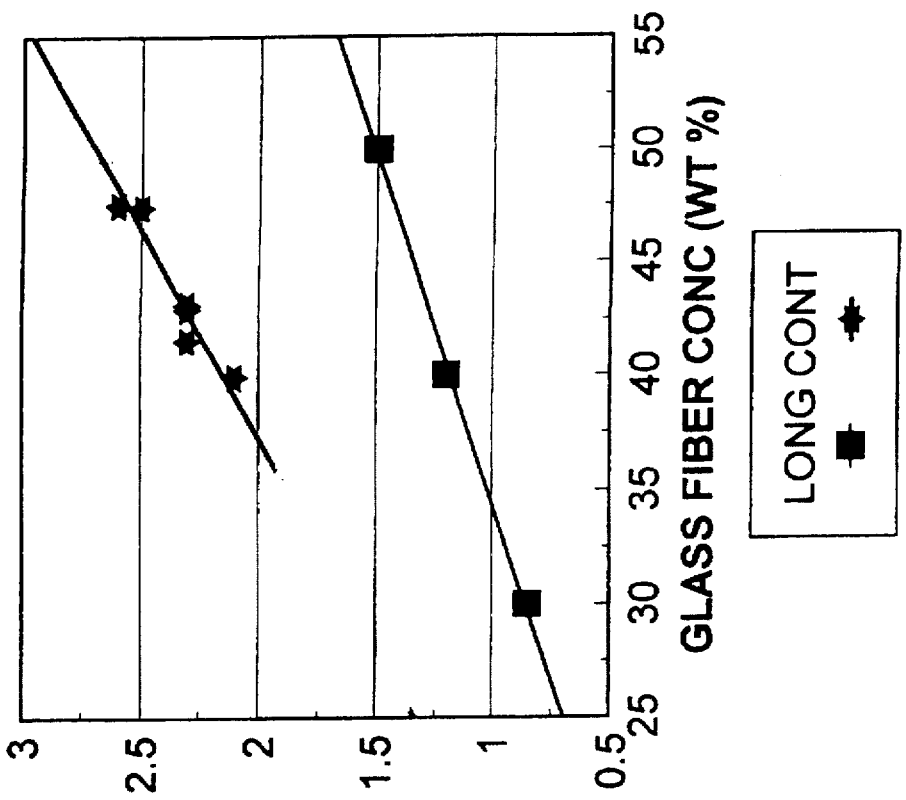
FIG. 4 is a graph showing the mechanical properties of polypropylene composites in accordance with the invention.
Figure 4A:
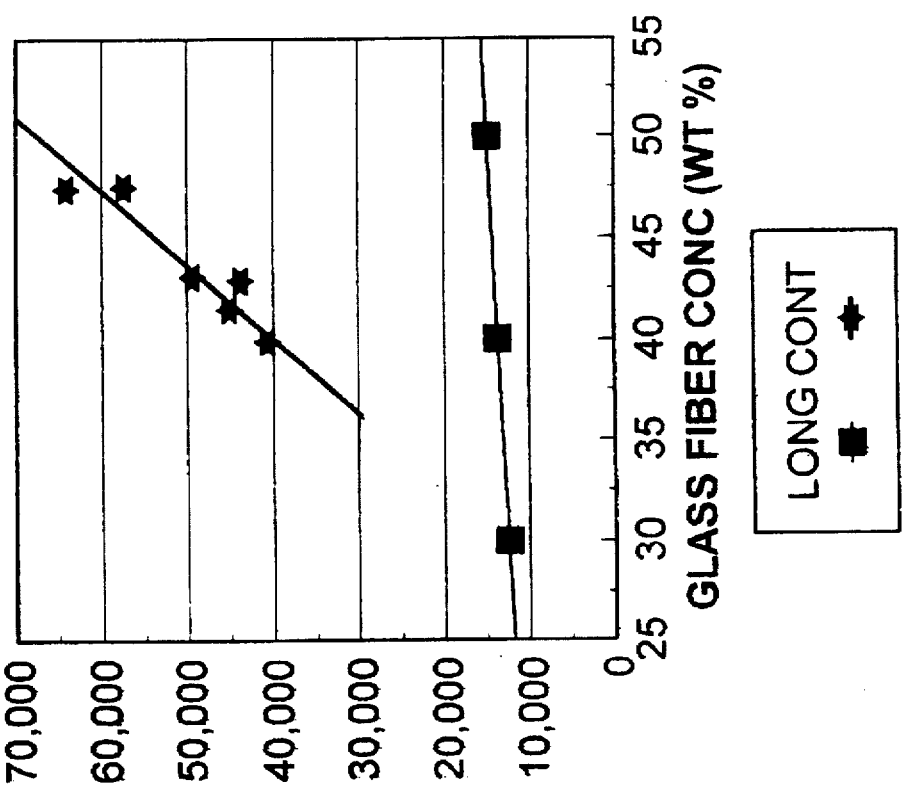

FIG. 4 graphically illustrates the tensile strength and flexural modulus properties of continuous glass filled polypropylene composite rods and long fiber glass filled in accordance with the invention at various glass fiber concentrations.

Figure 5:
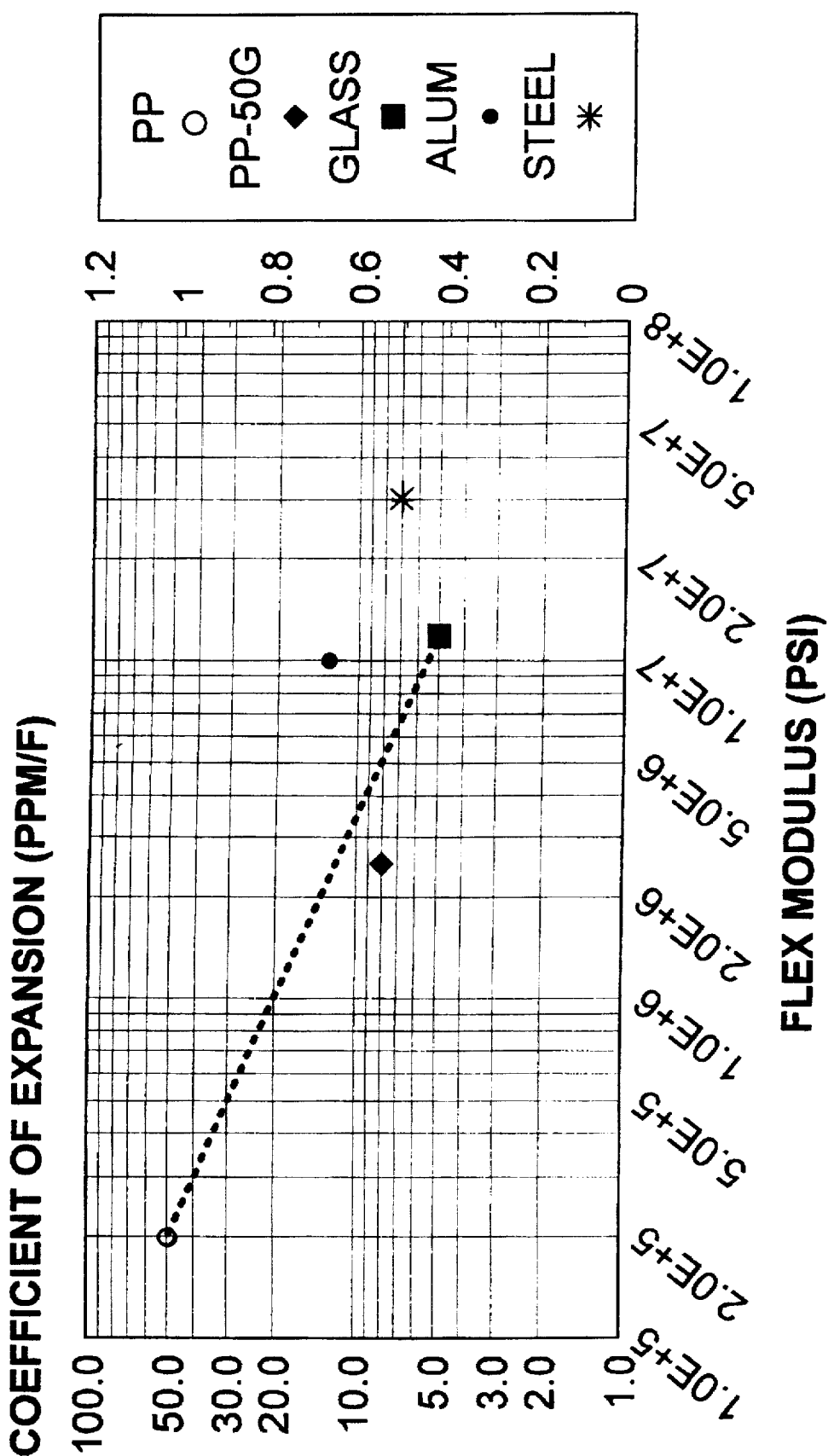
FIG. 5 is a graph showing the coefficient of linear thermal expansion versus modulus for various construction materials, including composites in accordance with the invention.

FIG. 5 shows the coefficient of linear thermal expansion (CLTE) versus flexural modulus (in PSI) for a 50 percent glass/polypropylene composite in accordance with the invention and with various other materials.

EXAMPLE

A fiber reinforced thermoplastic composite reinforcing bar was produced by combining sixteen fiber glass rovings, each of 4,000 filaments and introducing them into an impregnation chamber of the type illustrated and described in U.S. Pat. No. 5,447,793. Polypropylene resin was introduced into the extruder where it was heated to a temperature of approximately 575° F. in the extruder barrel. The molten polypropylene polymer was directed into the impregnation chamber where it flowed in countercurrent relation to the advancing fibers. The individual fibers of the respective rovings were thoroughly impregnated and wet out by the polymer. The thoroughly wetted and impregnated filamentary fibers were then directed through a die having a nominal diameter of 0.5 inches. The die profile is shown in FIG. 3 and is similar to a sextuple knuckle thread. Upon extrusion through the die, a six lobe flute was formed on the surface of the rod. A canted belt puller imparted to twist the flutes and the fiber. Fiber concentration of the product was 50 percent by weight. The resulting reinforcing bar product had very high tensile strength and flexural modulus, as shown in Table 3. For comparison, the corresponding values for aluminum and carbon steel are shown.

TABLE 3

|  | 1100 Aluminum | Carbon Steel | Example |
|---|---|---|---|
| Tensile strength (× 10³ PSI) | 18 | 65–90 | 65 |
| Modulus (× 10⁶ PSI | 10 | 30 | 2.6 |
| CLTE (ppm/F) | 13 | 7 | 8 |

That which I claim is:

1. An elongate fiber reinforced thermoplastic composite comprising a multiplicity of filamentary fibers, each extending longitudinally of the composite, and a thermoplastic resin matrix impregnating and surrounding said filamentary fibers, said composite having alternating lobes and valleys on its surface defining a fluted cross section, said lobes and valleys extending helically along the longitudinal axis of the composite.

2. A composite as defined in claim 1, wherein said fibers comprise 20 to 80 percent by weight of the composite.

3. A composite as defined in claim 1, wherein the number of fibers in said elgngate composite is within the range of 2,000 to 70,000,000.

4. A composite as defined in claim 1, wherein the number of said lobes is from 3 to 150.

5. A composite as defined in claim 4, wherein said lobes have an obtuse, generally smooth configuration.

6. A composite as defined in claim 1, wherein said elongate composite has a diameter of from 0.125 to 8 inches.

7. A composite as defined in claim 1, wherein said lobes and valleys and said filamentary fibers extend helically at the same helical pitch.

8. A composite as defined in claim 7, wherein said helical pitch is from about 1.5 to about 8 inches.

9. A composite as defined in claim 7, wherein said filamentary fibers also extend helically along the longitudinal axis of the composite.

10. A composite as defined in claim 1 wherein said thermoplastic resin matrix forms the outer surface of said composite, and wherein said surface is plasma or corona treated.

11. A composite as defined in claim 1, wherein said filamentary fibers have a length coextensive with the length of the elongate composite.

12. A composite as defined in claim 1 in the form of a pellet having a diameter of about 0.125 to 0.5 inch and a length of about 0.25 to 1 inch.

13. A composite as defined in claim 1 in the form of an elongate rod having a diameter of about 0.125 to 8 inches and a length at least twenty times its diameter.

14. An elongate fiber reinforced thermoplastic composite comprising from 2,000 to 70,000,000 filamentary fibers, each extending longitudinally of the composite generally parallel to one another and free of entanglement with other fibers, the fibers comprising at least one of the materials selected from the group consisting of manmade continuous filament organic, glass, and carbon fibers, each fiber having a length coextensive with the length of the elongate composite, and a thermoplastic resin matrix impregnating said fibers and maintaining individual fibers separate from and extending longitudinally generally parallel to and free of entanglement with other fibers, said fibers comprising from 20 to 80 percent by weight of the composite, and said composite having alternating lobes and valleys on its surface defining a fluted cross section, said lobes and valleys extending helically along the longitudinal axis of the composite, and said filamentary fibers also extending helically along the longitudinal axis of the composite.

15. An elongate composite reinforcing bar suitable for reinforcing concrete, said reinforcing bar comprising from 2,000 to 70,000,000 filamentary fibers, each extending longitudinally of the composite generally parallel to one another, and a thermoplastic resin matrix impregnating said fibers, said fibers comprising from 20 to 80 percent by weight of the reinforcing bar, and said bar having alternating lobes and valleys on its surface defining a fluted cross section, said lobes and valleys extending helically along the longitudinal axis of the bar.

16. A reinforcing bar according to claim 15 wherein the individual filamentary fibers are distributed substantially throughout the cross section of the bar and have a length which is coextensive with the length of the bar.

17. A reinforcing bar according to claim 16 wherein the fibers are glass fibers and the thermoplastic resin matrix is polypropylene.

* * * * *